US007452513B2

(12) United States Patent
Matveev

(10) Patent No.: US 7,452,513 B2
(45) Date of Patent: *Nov. 18, 2008

(54) TRIPLE HELICAL FLOW VORTEX REACTOR

(76) Inventor: Igor Matveev, 7231 Woodley Pl., Falls Church, VA (US) 22046

( * ) Notice: Subject to any disclaimer, the term of this patent is extended or adjusted under 35 U.S.C. 154(b) by 272 days.

This patent is subject to a terminal disclaimer.

(21) Appl. No.: 11/309,644

(22) Filed: Sep. 2, 2006

(65) Prior Publication Data

US 2008/0056961 A1    Mar. 6, 2008

(51) Int. Cl.
*B01J 19/08*    (2006.01)
(52) U.S. Cl. .................................. 422/186; 422/224
(58) Field of Classification Search ............. 422/186, 422/224
See application file for complete search history.

(56) References Cited

U.S. PATENT DOCUMENTS

| 3,098,704 | A | * | 7/1963 | Fritz | 423/659 |
|---|---|---|---|---|---|
| 4,361,441 | A | | 11/1982 | Tylko | 373/22 |
| 4,801,435 | A | | 1/1989 | Tylko | 422/186.04 |
| 5,321,327 | A | | 6/1994 | Jensen | 310/11 |
| 6,298,659 | B1 | | 10/2001 | Knuth et al. | 60/258 |
| 6,601,380 | B2 | | 8/2003 | Knuth et al. | 60/258 |
| 6,827,082 | B1 | | 12/2004 | Kogan et al. | 126/680 |
| 6,865,878 | B2 | | 3/2005 | Knuth et al. | 60/258 |
| 2003/0152184 | A1 | | 8/2003 | Shehane et al. | 376/103 |
| 2006/0008043 | A1 | | 1/2006 | Shehane et al. | 376/103 |

OTHER PUBLICATIONS

Chiaverini, Martin J., et al., "Vortex Thrust Chamber Testing and Analysis for O2-H2 Propulsion Applications," Jul. 20-23, 2003, AIAA 2003-4473, 39th AIAA/ASME/SAE/ASEE Joint, Orbital Technologies Corporation, Propulsion Conference and Exhibit.
Korolev, Yury D., et al., "Non-steady State Processes in a Plasma Pilot for Ignition and Flame Control," Submitted to the Special Issue of the IEEE Transactions on Plasma Science, Mar. 6, 2006.

* cited by examiner

*Primary Examiner*—Kishor Mayekar
(74) *Attorney, Agent, or Firm*—Louis Ventre, Jr.

(57) ABSTRACT

A triple helical flow vortex reactor has a reaction chamber (100) with the means to create three fluid flow vortexes and an optional double end orbiting plasma arc to sustain combustion. The first vortex is of fuel and combusted gases such that said fuel and combusted gases spiral away from a fuel inlet end (150) towards an exhaust nozzle or gas outlet end (110) of the reaction chamber (100). The second vortex is one starting at the gas outlet end (110) and confined to a thin layer at the inner wall surface (130) of the reaction chamber (100). The second vortex spirals in a direction reverse to the flow of the first vortex towards the fuel inlet end (150) of the reaction chamber (100). The third vortex is starting at the fuel inlet end and also confined to a thin layer at the inner wall surface (130) of the reaction chamber (100) in a direction with the flow of the first vortex.

18 Claims, 7 Drawing Sheets

TRIPLE HELICAL FLOW VORTEX REACTOR

FIELD OF INVENTION

In the field of vortex flow field reaction motors, a reactor employing at least three helical flow vortexes in a reaction chamber in which a fuel is injected, mixed with an oxidizer and consumed during a combustion process.

BACKGROUND OF THE INVENTION

A vortex reactor has a reaction chamber, which is typically mostly cylindrical, but may have other shapes. The reaction chamber has an exhaust or nozzle end and a closed or fuel inlet end, usually at opposite ends of the reaction chamber.

Vortex reactors in the prior art employ one or two vortexes to create specific fluid flow fields in the reaction chamber that accomplish specific goals. Typically, fuel and oxidizer fill the inside of the reaction chamber from its nozzle to its fuel inlet before it is combusted.

The present invention employs three vortexes in the reaction chamber forming and changing the flow fields to accomplish specific goals. The third vortex forms a greater concentration of the fuel and oxidizer in a mixing region adjacent to the fuel inlet and it optionally serves as a means to create a double-ended moving plasma arc in the mixing region to improve the performance of the reactor. Because of the rapid propagation of combustion due to the enhanced mixing and double end, rotating and traveling arc, more complete combustion occurs. Rapid and complete combustion enables greater diversity in fuel, enhanced combustion efficiency and stability and inherently avoids potentially disruptive explosions created when ignition occurs in a reaction chamber filled with unignited fuel.

In a vortex reactor, combustion occurs in the reaction chamber in a first vortex of fluid flow spiraling outward around the axis of the reaction chamber and towards the nozzle end. This vortex is typically induced by the swirling introduction of fuel, or a fuel and oxidizer mixture, into the combustion chamber.

Fuel as used herein and as is typical in the art may include gases, liquids, solids such as particles or powders, and reagents. If just fuel is introduced, then it is subsequently mixed with an oxidizer, for example air, within the reaction chamber and ignited. The gases resulting from ignition and combustion along with any uncombusted fuel continue to exit out the nozzle end of the reaction chamber in a vortex of spiraling helical flow. Incomplete mixing is often a cause of unburned fuel being discharged from the reaction chamber and any mechanism to encourage more thorough mixing can add to reactor efficiency by reducing the discharge of unburned fuel. This first vortex is also referred to herein as the primary vortex.

A reverse vortex reactor introduces a second vortex, which is a circumferential vortex fluid flow, typically air or other oxidizer, around the wall or periphery of the reaction chamber starting at the nozzle end of the reaction chamber and spiraling towards the fuel inlet end. U.S. Pat. No. 6,298,659 to W. H. Knuth, et al. on Oct. 9, 2001 is representative of this prior art.

In a reverse vortex reactor, the first vortex is in the center of the reaction chamber and the second vortex is at the wall of the reaction chamber. A reverse vortex reactor essentially adds the second vortex creating double helical vortex flow fields moving in opposite directions. This second vortex is a circumferential fluid flow that spirals at the periphery of the reaction chamber away from the nozzle end toward the closed end in a direction reverse to the flow in the first vortex. When the second or reverse vortex fluid flow reaches the closed end, it wells up back towards the nozzle end combining with and taking the path of the first vortex rotating about the axis of the reaction chamber. A fluid flow welling up around the axial center enhances mixing of fuel with the oxidizer. A chemical reaction, such as combustion, may then be induced to take place in a central region of the reaction chamber keeping the walls or periphery cool by the spiraling action of the reverse circumferential fluid flow at the wall of the reaction chamber. Essentially, the walls are protected from combustion by the reverse vortex fluid flow occupying the wall region in the chamber.

The triple helical flow vortex reactor of the present invention is new in the field of vortex flow field reactors. It introduces a third vortex, which is a circumferential vortex fluid flow, typically air or other oxidizer and optionally including fuel, around the wall or periphery of the reaction chamber starting at the fuel inlet end of the reaction chamber and spiraling towards the nozzle inlet end. This third vortex opposes the circumferential fluid flow in the second vortex. The opposing circumferential fluid flow in the third vortex changes the reaction chamber flow fields considerably, creating a vigorous mixing region at the fuel inlet end of the reaction chamber and substantially improving the efficiency of combustion. The enhanced mixing is itself a significant improvement to the prior art because it concentrates the combustible fuel and oxidizer to a smaller volume within the relation chamber that is more efficiently ignited. In addition to a reaction motor, other applications for the triple helical flow vortex reactor include a reactor for solid particle melting in specific gas environment with further deposition on different surfaces, and a reactor for mixing or combining chemicals.

Further efficiencies are obtained in an embodiment of the invention by adding capability to generate spatial plasma arcs to induce ignition within the reaction chamber. The means of the present invention to create a spatial plasma arc is new to the field of reaction chambers. It is essentially an electrical arc generated between an anode and cathode in which the end of the arc at the anode and the end of the arc at the cathode travel and rotate or orbit around the relation chamber within the mixing zone. The plasma arc is expanded and rotated by action of the fluid flow. In the preferred embodiment, the fluid flow from the third vortex is utilized for expanding and rotating the arc. Such arc expansion contributes to extending electrode lifetime, and has even greater benefit in combustion efficiency and reactor size and weight reduction, which are desirable in applications such as an aircraft and rocket engines.

Spatial arcs in accordance with an embodiment of the invention typically cycle or transition from glow to spark and back on a nanosecond time scale. Such short time scale, expanding discharges deliver a substantial improvement to the prior art by reducing the voltage required for spark ignition of combustion gases, lowering average electrical power consumption, simultaneously releasing very high pulsed energy, which consequently speeds the rate of combustion, and improves combustion stability. For example, with the spark current of about 200 amperes and pulse duration of about 100 nanoseconds, instantaneous power in the spark reaches a megawatt. One more important environmental factor in reactor combustion is arc temperature and its interaction time with the burning mixture. Too high a temperature or too long an arc interaction with the fuel increases formation of nitrogen oxides, which are the polluting exhaust gases. The invention reduces formation of nitrogen oxides by enabling a low-power arc with nanosecond discharges.

Conventional methods of producing arc plasmas in reaction chambers, for example, plasma torches, such as plasmatrons, are based on constricting either one or both ends of an arc discharge to a particular location, which tends to generate small volumes of plasma at high temperatures, delivering poor combustion and a low overall efficiency of the vortex reactor. It also tends to quickly burn out one or both electrodes.

The prior art teaches a means to enable an expanding arc by locating an electric arc discharge symmetrically in the center of a hollow rotating cylinder so that the arc begins to expand radially outwards due to viscous drag forces. Discussion of this prior art is in U.S. Pat. No. 4,801,435 to J. K. Tylko on Jan. 31, 1989. Tylko also describes a second method using a plasma torch acting as a cathode, which is made to orbit in a circular path and at a small angle with the vertical, projecting the arc to a downstream annular anode. Tylko teaches a means for making one end of an arc travel using sequential energization of plasma torches or electromagnetic circulation.

These prior art techniques are generally disfavored because they add considerable weight to the reactor, typically cause rapid failure of the reaction chamber and add further complicated equipment that is susceptible to failure. Because the plasma arc in the present invention permits both ends of the plasma arc to travel as a function of the vortex flow, no complicated equipment is needed, no added weight is involved, the life of the anode and cathode are extended over that achievable in the prior art and increases the volume of the arc in the mixing region positively affects combustion efficiency, which translates to greater fuel diversity potential for the reactor.

Prior art vortex reactors generally perform poorly with particulate matter fuels. The particles tend to interfere with the formation and energy transfer from a plasma arc. Because the plasma arc of the present invention operates on non-steady state pulses of nanosecond duration, the very high instantaneous power transfer minimizes problems attendant with particulate matter fuels.

Accordingly, the present invention will serve to improve the prior art by changing the number of vortex flow fields to create an enhanced mixing zone. It further improves the state of the art in plasma ignition of the fuel. These improvements deliver a vortex reactor with enhanced capability for fuel diversity, improved operating efficiency, lower environmental pollution, and significantly lower voltages, and consequently power, required to initiate combustion. A significant advantage is a vortex reactor that is lighter and smaller than present reactors with the same power output.

BRIEF SUMMARY OF THE INVENTION

A triple helical flow vortex reactor has a reaction chamber with the means to create at least three fluid flow vortexes and an optional double end orbiting plasma arc to sustain combustion. The first vortex is of fuel and combusted gases such that said fuel and combusted gases spiral away from a fuel inlet end towards an exhaust nozzle or gas outlet end of the reaction chamber. The second vortex is one starting at the gas outlet end and confined to a thin layer at the inner wall surface of the reaction chamber. The second vortex spirals in a direction reverse to the flow of the first vortex towards the fuel inlet end of the reaction chamber. The third vortex is starting at the fuel inlet end and also confined to a thin layer at the inner wall surface of the reaction chamber in a direction with the flow of the first vortex.

BRIEF DESCRIPTION OF THE DRAWINGS

The principles of the invention are described with reference to the accompanying drawings, in which the same elements are accorded the same reference numbers.

DETAILED DESCRIPTION

Embodiments of a triple helical flow vortex reactor in accordance with the invention are described with reference to the figures, which are intended as examples to illustrate the invention and not as limitations.

Figure 1:
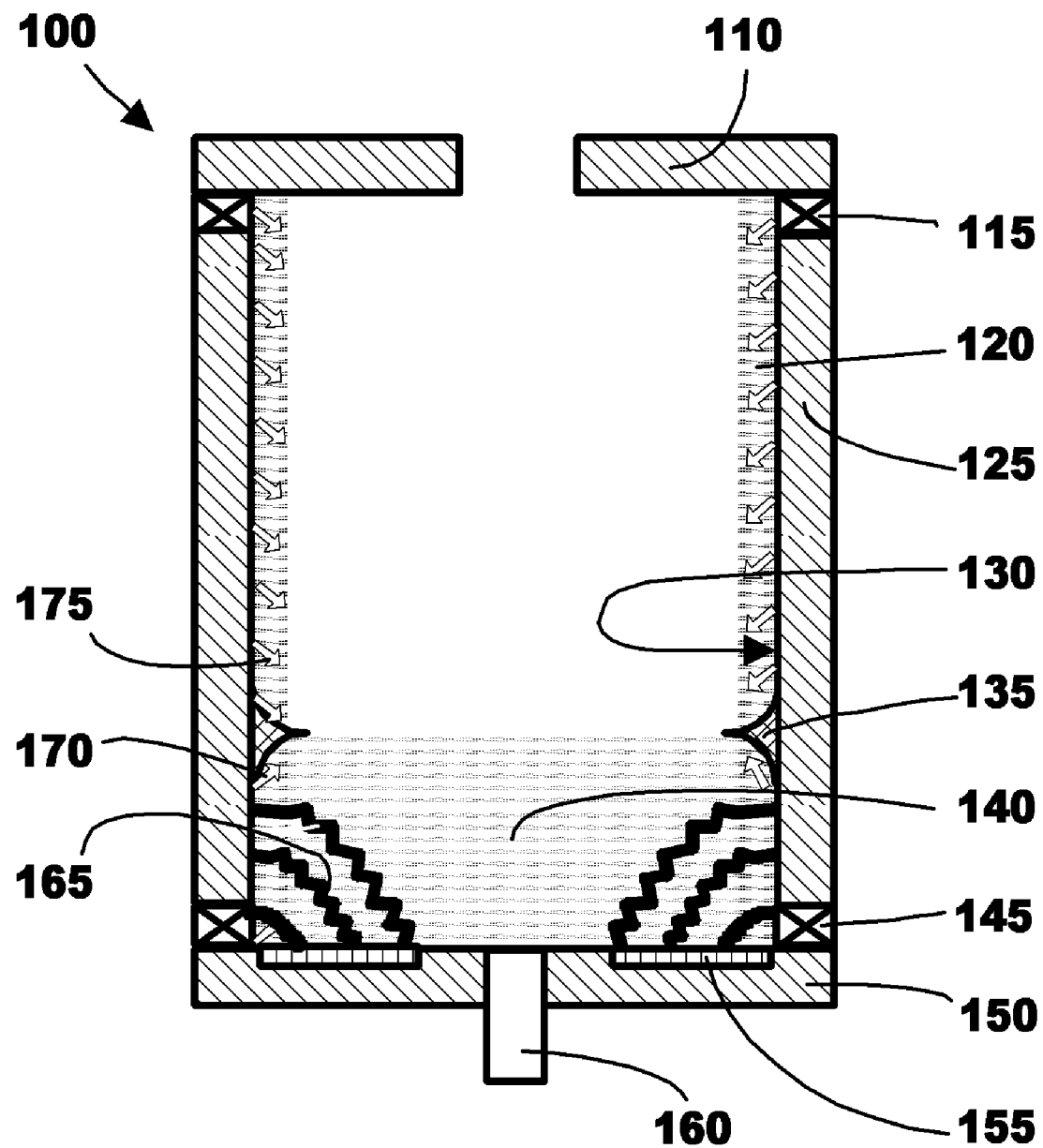
FIG. 1 is a vertical cross-section of a reaction chamber in a preferred embodiment in accordance with the invention.

FIG. 1 shows a cross-section of a reaction chamber (100) in accordance with a preferred embodiment of the invention. A reaction chamber (100) has fuel inlet end (150), a gas outlet end (110) at opposing axial ends of the reaction chamber, and a wall (125). A fuel inlet (150) at one end serves as the means to add a first vortex of fuel to the reaction chamber (100). This is a standard fuel inlet, well known in the art. A gas outlet end (110) is interchangeably referred to herein as the nozzle end. The terminology gas outlet end and fuel inlet end are used for convenience and are not intended to limit the placement of the fuel inlet or the gas outlet in the reaction chamber.

Fuel is the propellant that burns, and includes any reagents that assist combustion, to provide thrust when combustion gases exit through a gas outlet end (110) of the reaction chamber (100). Fuel as used herein includes gaseous, solid and liquid fuels. Typical gaseous fuels include natural gas, hydrogen and propane. Typical liquid fuels include alcohol, gasoline, diesel, kerosene, liquid hydrogen, and jet fuel. Typical solid fuels are particles or powders of solid rocket fuel, or other combustible materials such as coal.

The fuels can be fed by apparatus well known in the art, such as gaseous and liquid nozzles or atomizers, through holes and orifices, through porous materials, with special distributors similar to those found in residential gas ovens, with screw feeders, blowers, mixing devices to create gas plus gas blends, gas plus solid particle blends, gas plus liquid reagent foam or suspension, and any number of other possible combinations. The fuels may be fed separately, or in combination. They may be fed through a plasma generator. Solid fuels, for example metal powders on the basis of aluminum, are high enthalpy fuels for rocket engines.

FIG. 1 depicts a reaction chamber (100) with a closed or fuel inlet end (150) and a gas outlet end (110), which are shown in typical positions at opposing axial ends of the reaction chamber (100). The reactor has a means to create and introduce a fluid flow first vortex of fuel into the reaction chamber (100) in accordance with well known techniques. This is indicated in FIG. 1 as a fluid feeder or combination fluid feeder and plasma generator (160). In this first vortex, the fuel spirals away from the fuel inlet end (150) towards the gas outlet end (110).

FIG. 1 shows a first circumferential flow apparatus (115) positioned at the gas outlet end (110). A circumferential flow apparatus is known in the art of vortex reactors. However, the current invention preferentially employs a modified version illustrated in FIGS. 7-9 and having additional capabilities to insulate and provide a desired gap between a cathode and anode. Such capabilities are not known in the state of the art.

The first circumferential flow apparatus is capable of creating a circumferential fluid flow second vortex (120) having a flow vector (175) that is closely confined near the inner wall surface (130) of the reaction chamber (100), that is, at the periphery of the reaction chamber, such that this second vortex spirals away from the first circumferential flow apparatus and the gas outlet end (110) towards the fuel inlet end (150) in a direction reverse to the fluid flow first vortex.

FIG. 1 shows a second circumferential flow apparatus (145) positioned at the fuel inlet end (150). This second circumferential flow apparatus is capable of creating a circumferential fluid flow third vortex having a flow vector (170) that is closely confined near the inner wall surface (130) of the reaction chamber (100), that is, at the periphery of the reaction chamber, such that this third vortex spirals in a forward direction parallel with the fluid flow first vortex so that when it impacts the first circumferential flow moving in the opposite direction, it creates a central mixing region (140) adjacent to the fuel inlet end (150). The fluid flow third vortex is best implemented when it has a volumetric flow rate that is less than the volumetric flow rate in the second vortex and preferably about 15 percent of the volumetric flow rate in the second vortex.

FIG. 1 illustrates an optional circumferential flow restrictor (135) on the inner wall surface (130) of the reaction chamber, which is located at the point of confluence of the second vortex and the third vortex. This circumferential flow restrictor (135) limits the circumferential fluid flows from the second and third vortexes and directs their flow towards the center of the reaction chamber (100).

FIG. 1 illustrates another aspect of a preferred embodiment in accordance with the present invention. The wall (125) of the reaction chamber is electrically connected to ground to form an anode. A charged cathode (155) is electrically insulated from and affixed in the reaction chamber at the fuel inlet end (150). The preferred embodiment of the cathode as shown in FIG. 1 is in the shape of a washer laid flat on the inside of the reaction chamber at the fuel inlet end (150) and extending close to the second circumferential flow apparatus (145), but not directly touching the second circumferential flow apparatus (145). This arrangement creates a circumferential gap separating the electrical potentials of cathode and anode. The circumferential gap is typically uniform, but not required to be so, around the circumference of the reaction chamber (100) between the second circumferential flow apparatus (145) and the cathode (155). Preferably, the circumferential gap is about 3 millimeters or less. The circumferential gap may be a fluid gap or a solid gap between the cathode and anode, and in all cases permits an electrical potential difference between the anode and cathode.

FIG. 1 illustrates a second circumferential flow apparatus (145), which in the preferred embodiment, is made of an electrically conducting material. Therefore, in the preferred embodiment, the second circumferential flow apparatus (145) is electrically connected to the reaction chamber serving as an anode. The circumferential gap enables formation of an electrical arc (165) initiated between the cathode (155) and the anode when the voltage difference between the cathode and anode so permits, which is termed the breakdown voltage. This placement of the cathode also enables both ends of the arc (165) to rotate and expand away from the gap by action of the fluid flow in the third vortex. This type of double end, rotating and traveling arc is a spatial arc. The fluid flow pushes and rotates both ends of the arc simultaneously. The spatial arc, therefore, is not simply a straight line. It crudely resembles ocean waves. A spatial arc has a life cycle from initiation (typically less than about 3 millimeters length) to the moment when it becomes so long that the potential difference, or voltage, between the anode and cathode can no longer support it. Arc lengths up to 120 millimeters in length were obtained in testing using an operating voltage ranged from several hundred volts to 7 kilovolts with an open circuit voltage ranging up to 15 kilovolts and current from several milliamps to hundreds of milliamps. However, the invention is not limited to these performance parameters.

Figure 2:
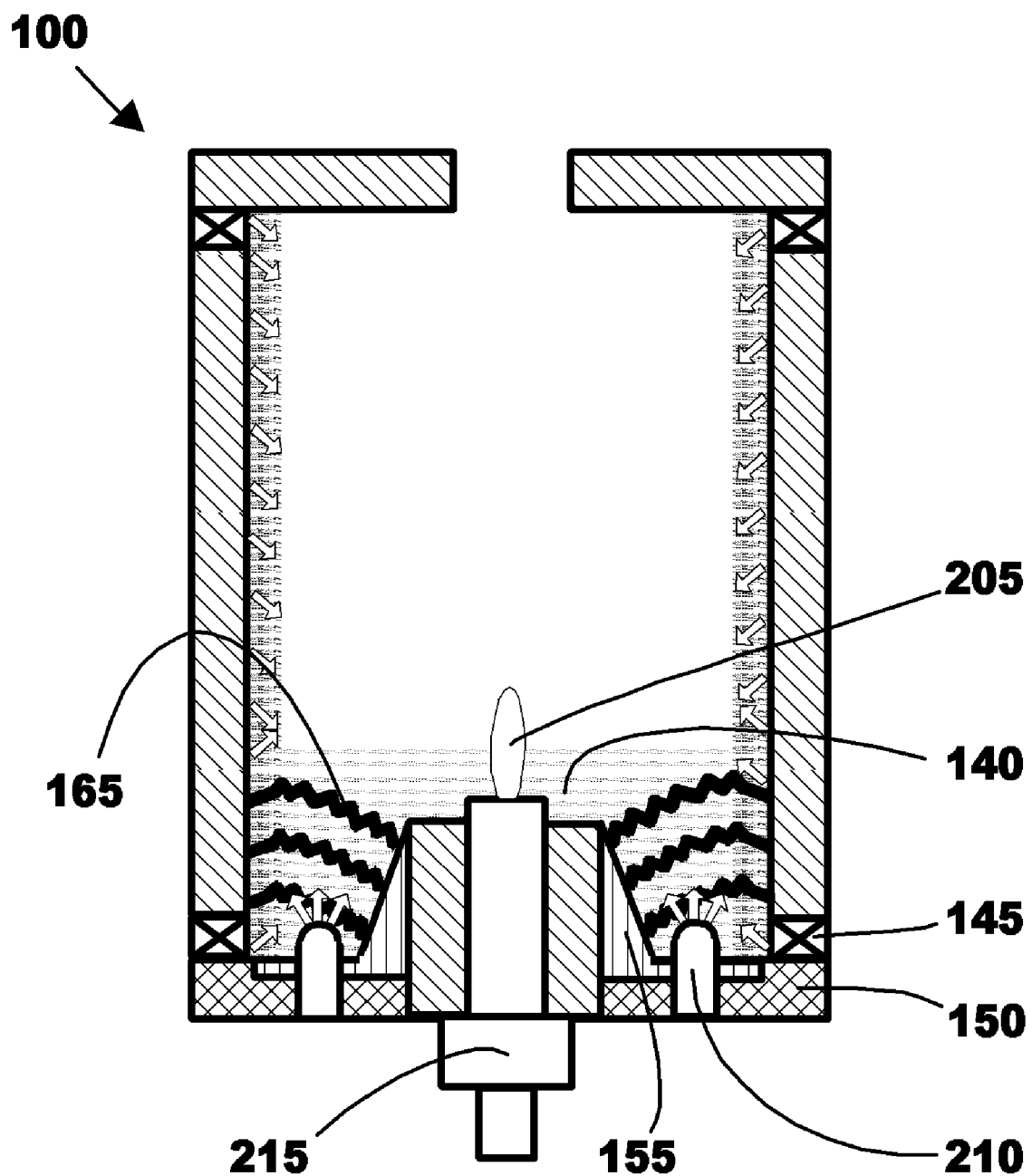
FIG. 2 is a vertical cross-section of a reaction chamber in an embodiment employing a shaped cathode.

FIG. 2 shows an alternative embodiment of a reaction chamber (100) serving as an anode and using a charged cathode (155) that is a shaped body rising into the mixing region (140) from the fuel inlet end (150). For this embodiment, the fuel inlet end (150) is made with non-conducting material so as to be an insulator and not electrically connected to the anode. This cathode configuration permits an electrical arc (165) to rise up further into the mixing region (140). Movement of the electrical arc (165) is controlled by action of the fluid in the third vortex created by the second fluid flow apparatus (145). An optional plasma torch (205) may be used to aid in more complete combustion. The plasma torch (205) is fed by a fuel standard nozzle, plasma pilot, or plasma fuel nozzle (215), commonly used for such torches. Fuel is sprayed into the reaction chamber (100) with standard spray nozzles (210).

Figure 3:
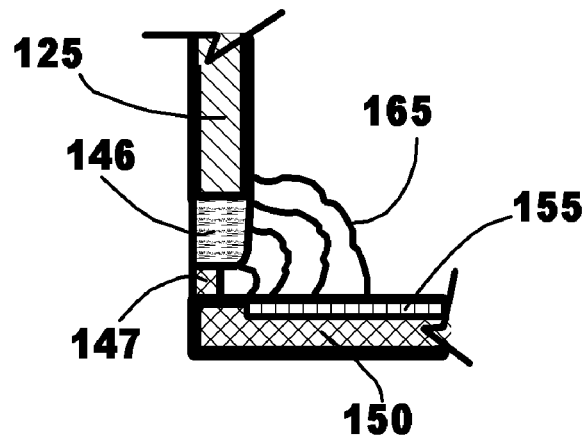
FIG. 3 is a vertical cross-section of a reaction chamber corner at the fuel inlet end.
Figure 4:
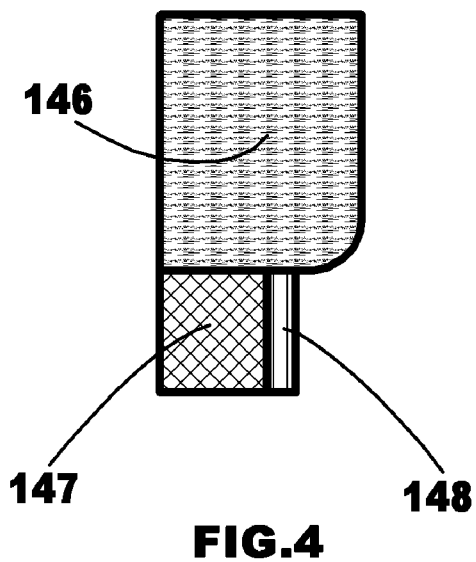
FIG. 4 is a vertical cross-section of a two-portion circumferential flow apparatus.
Figure 5:
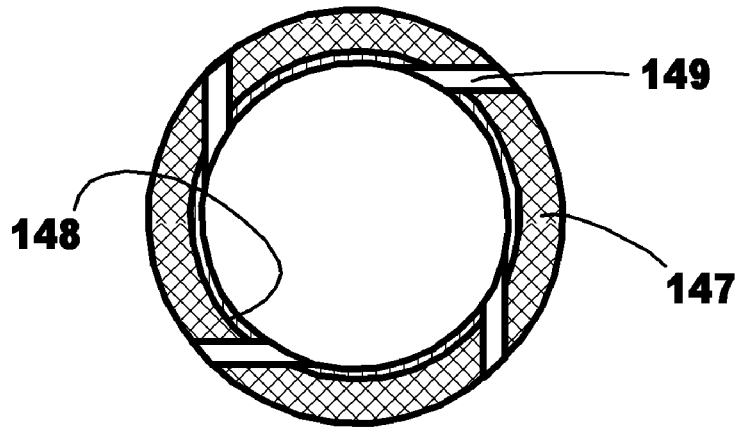
FIG. 5 is a horizontal cross-section of a bottom portion of a circumferential flow apparatus showing a semi-conductor layer.

FIGS. 3, 4 and 5 illustrate a second circumferential flow apparatus in embodiments of the invention employing a cathode and anode. The anode is the wall (125) of the reaction chamber, which is electrically connected to the first portion (146) of the second circumferential flow apparatus.

FIG. 3 shows a second circumferential flow apparatus (145 FIG. 1) in two portions, a first portion (146) and second portion (147).

The first portion (146) is electrically conducting and is thus at the same electrical potential as the anode. The first portion (146) is thus part of the anode. As shown, the first portion (146) is wider than a second portion (147).

The second portion (147) is electrically non-conducting and is recessed in respect to the first portion (146). Since it is electrically non-conducting, the second portion (147) insulates the anode from the fuel inlet end (150). The second portion (147) is of a thickness to provide the necessary circumferential gap between the anode and cathode (155). Electrical arcs (165) cross the circumferential gap at the appropriate breakdown voltage and are expanded by the third vortex flow from the second circumferential apparatus.

FIG. 4 is an enlarged view of a second circumferential flow apparatus (145 FIG. 1) showing the first portion (146) and the second portion (147). The second portion has a surface layer (148) that improves the conductivity of the second portion (147) to lower the voltage required to create an arc between the cathode and anode. This is a layer of material on a surface of the second portion facing the reaction chamber. This layer is typically made of sapphire or a semiconductor and would typically be required in high pressure applications where a lower breakdown voltage is desired. Such a layer is capable of providing a low voltage surface discharge, for example, down to 2.5 kilovolts, and solves the problem with high breakdown voltage in high pressure applications. An example of a commonly used semiconductor for ignition purposes is silicon carbide, which is heat resistant and can be fabricated even by cold curing technology from powder.

Other embodiments not shown, use such a surface layer over a circumferential flow apparatus on its surface exposed to the reaction chamber. This surface layer increases the circumferential gap for any given breakdown potential difference between a cathode and anode.

For embodiments that use a non-conducting circumferential flow apparatus, two options are available to maintain the desired circumferential gap between the cathode and anode and to increase the gap for a given breakdown voltage: The first is the insertion of an electrical conductor, which is electrically connected to the anode, into the circumferential flow apparatus such that the desired circumferential gap is obtained. The second is a surface layer previously described.

FIG. 5 show a top view horizontal cross-section of a second circumferential flow apparatus (145 FIG. 1) taken at a point to show the second portion (147) with a surface layer (148). The flow channels (149) to enable the introduction of the fluid creating the third circumferential flow field are shown, which are typical of such apparatus.

The triple helical flow vortex reactor has application when multiple, sequential reactors provide staged mixing or combustion. In this application, one or more reactors are adjoined along their axis such that the reaction chambers are fluidly connected together in series. A series connection occurs when the gas outlet end of any one reactor adjoins the fuel and reagents inlet end of another reactor.

Figure 6:
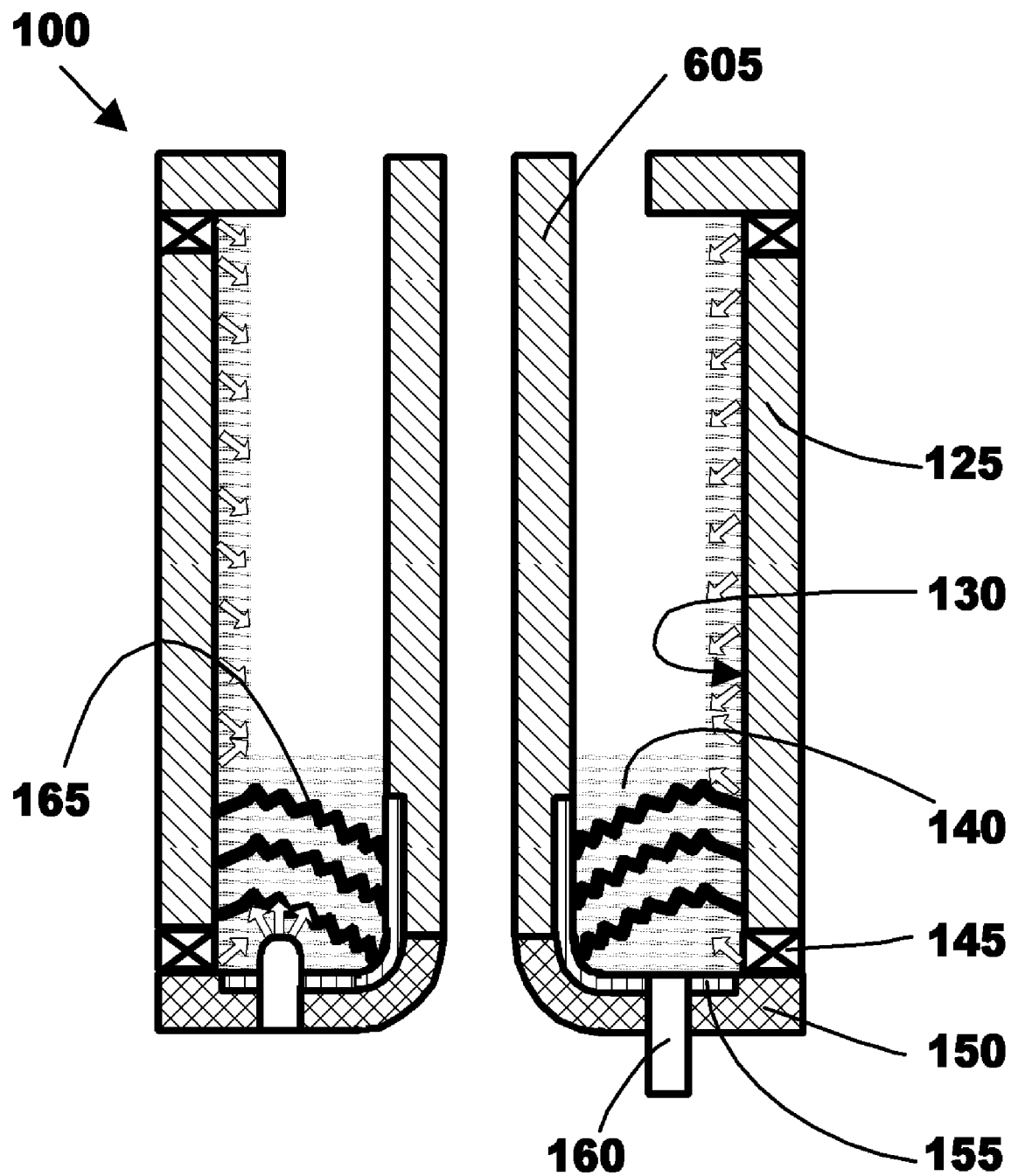
FIG. 6 is a cross-section of a reaction chamber with a co-axial cylindrical central body extending through the reaction chamber to accommodate the central shaft.

FIG. 6 illustrates embodiments of the invention accommodating a central shaft, for example for use in jet aircraft applications. In this type of embodiment, a co-axial cylindrical central body (605) occupies the central axial region of the reaction chamber (100) and extends through the reaction chamber (100) to accommodate the central shaft.

A vortex, by definition, is like a tornado having a relatively vacant central region, which forms without need for a structure to ensure that the center is vacant. The co-axial cylindrical central body (605), therefore, occupies a region of the reaction chamber that has little involvement in any of the three vortexes in the reaction chamber. However, the first, second and third vortexes and the mixing region (140) are structurally restricted to an annulus extending from the outer wall of the co-axial cylindrical central body (605) to the inner wall surface (130) of the reaction chamber (100).

FIG. 6 illustrates the means for creation of the plasma arcs in accordance with this embodiment of the invention. The co-axial cylindrical central body (605) is insulated from the charged cathode (155). Optionally, the co-axial cylindrical body (605) is the charged cathode (155). The charged cathode (155) is electrically insulated from the anode and the fuel inlet end (150), which is the wall (125) of the reaction chamber (100). The cathode and anode are electrically isolated from each other by a fuel inlet end (150) that is non-conducting. As with other embodiments, the second circumferential flow apparatus (145) provides the fluid flow for adding the third vortex and enabling a double end, rotating and traveling arc. While the spatial arc orbits with nanosecond pulse discharges and immediately ignites the fuel and oxidizer, further enhancement to combustion may be provided using a fluid feeder or combination fluid feeder and plasma generator (160).

Typical plasma generators include spark plugs, direct current and alternating current plasma generators, devices for generating radio-frequency wave energy, and lasers. Such wave energy devices create electromagnetic waves in low frequency, 30-300 kilohertz; medium frequency, 300-3000 kilohertz; high frequency, 3-30 megahertz; very high frequency, 30-300 megahertz; ultra high frequency, 300-3000 megahertz; super high frequency, 3-30 gigahertz; extremely high frequency, 30-300 gigahertz.

Figure 7:
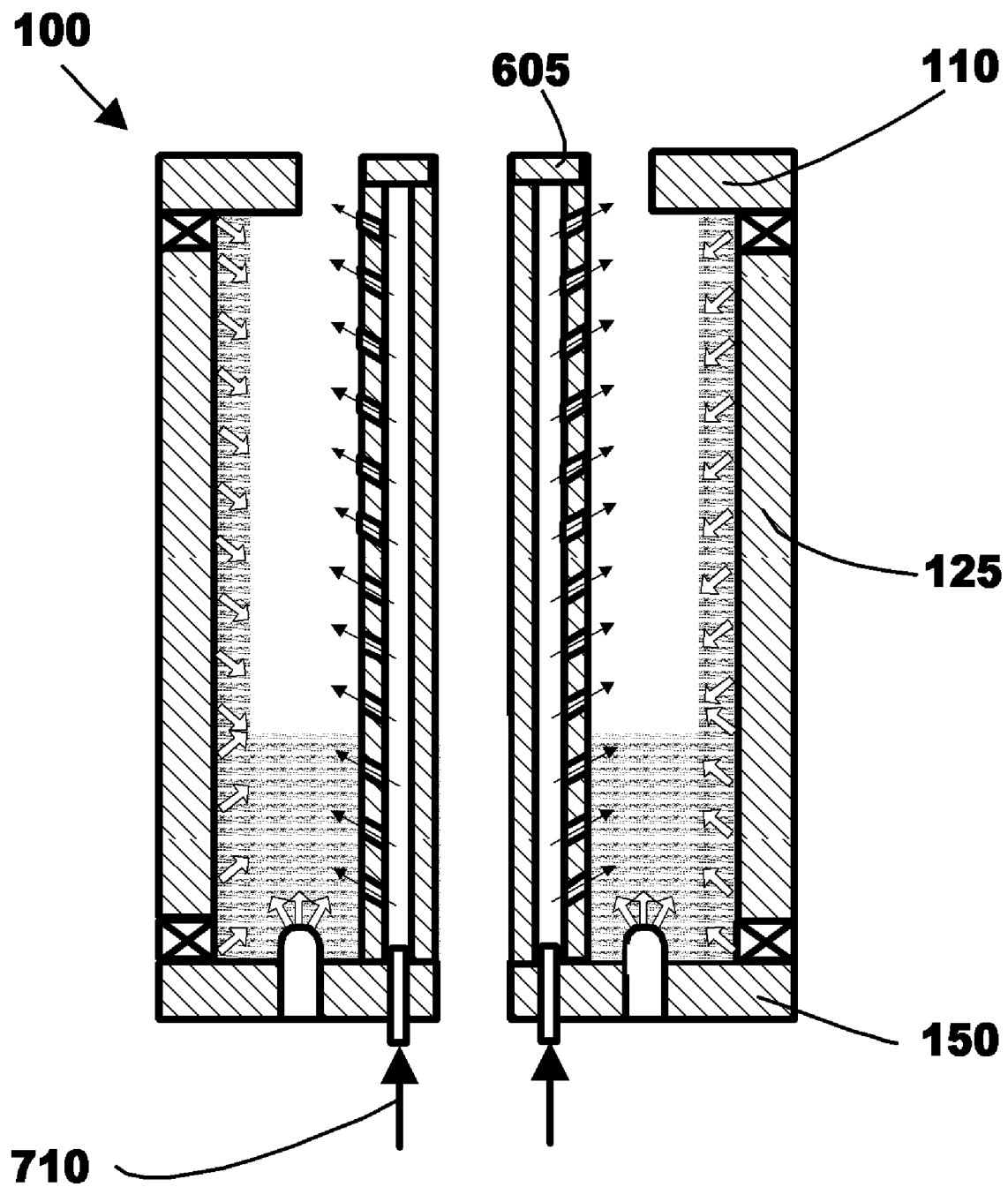
FIG. 7 is a cross-section of a reaction chamber wherein a co-axial cylindrical central body is double-walled and perforated to permit introduction of air therethrough.

FIG. 7 shows an alternative embodiment wherein the co-axial cylindrical central body (605) is double-walled and perforated such that oxidizer and reagents (710) can be fed into the reaction chamber through the perforations.

In some embodiments of the invention, the triple helical flow vortex reactor has a portion of the wall (125) of the reaction chamber (100) that is radio-transparent. Radio-transparent materials are well known in the art. The radio-transparent portion of the wall (125) may occupy a circumferential section of the wall and be any length along the reaction chamber. However, the radio-transparent portion need only be large enough to permit illumination of the inside of the reaction chamber with electromagnetic waves capable of igniting a fuel and oxidizer mixture flowing therein.

These embodiments include an inductively coupled plasma generator or a microwave plasma generator, herein referred to as an electromagnetic wave generator. This generator is capable of creating electromagnetic waves at a plurality of frequencies, which are predominantly in a range of tens of kilohertz to hundreds of gigahertz. The generator would typically be located external to the reaction chamber. The electromagnetic wave generator would include a wave guide, positioned to deliver the electromagnetic waves through the radio-transparent portion of the wall (125).

The electromagnetic wave generator would further include an initiator within the reaction chamber. The initiator is positioned in the line of sight of the radio-transparent portion, or on the fuel inlet end (150), or elsewhere in the reaction chamber to suit the application.

For example, if inductively coupled plasma is employed with a low-frequency to high-frequency electromagnetic wave generator, then a small and short injection of the ionized matter starts the plasma formation process in the entire reaction chamber volume. Thus, a spark plug or low power plasma generator is the best initiator. Such initiators would be placed on the fuel inlet end to permit injection along the chamber axis. For this application, the initiator would be best positioned at the fuel inlet end. It would not be positioned in the line of sight of the radio-transparent portion because these initiators would be adversely heated by the electromagnetic field and damaged.

On the other hand, for higher-frequency applications using electromagnetic waves in the gigahertz range (several centimeters wave length), a better initiator is a metal strip along the radio transparent section of the reaction chamber. Such metal strip is of any length, any thickness, and any width fitting along the internal reaction chamber surface and on the opposite side to the wave guide. Thus, in the line of sight of the radio-transparent portion so that when illuminated with the laser or radio-frequency waves, it generates a plasma capable of igniting the fuel and oxidizer mixture.

In yet other applications using other wave bands and numerous microwave plasma generator designs, the initiator is located in any suitable position in the reaction chamber.

An initiator is well known in the art and is a means to create a plasma discharge and pre-discharges such as sparks, streamers, inductively coupled plasmas, microwave plasmas, and glow and corona discharges. Among the more common initiators are a spark plug, a plasma torch, a device to create a pressure reduction or partial vacuum in the reaction chamber, a device to inject high-frequency wave energy absorbers like powders and gases with low ionization potential, and electrodes which are internal and external to the reaction chamber. Selection of an initiator depends on many factors, such as pressure, plasma feedstock gas flow, chemical structure, frequency and output power of supporting power generator, electrodes and reaction chamber geometry.

Finally, the electromagnetic wave generator would further include a plasma generator capable of initiating plasma discharges by injecting ionized fuel and oxidizer into the reaction chamber.

Figure 8:
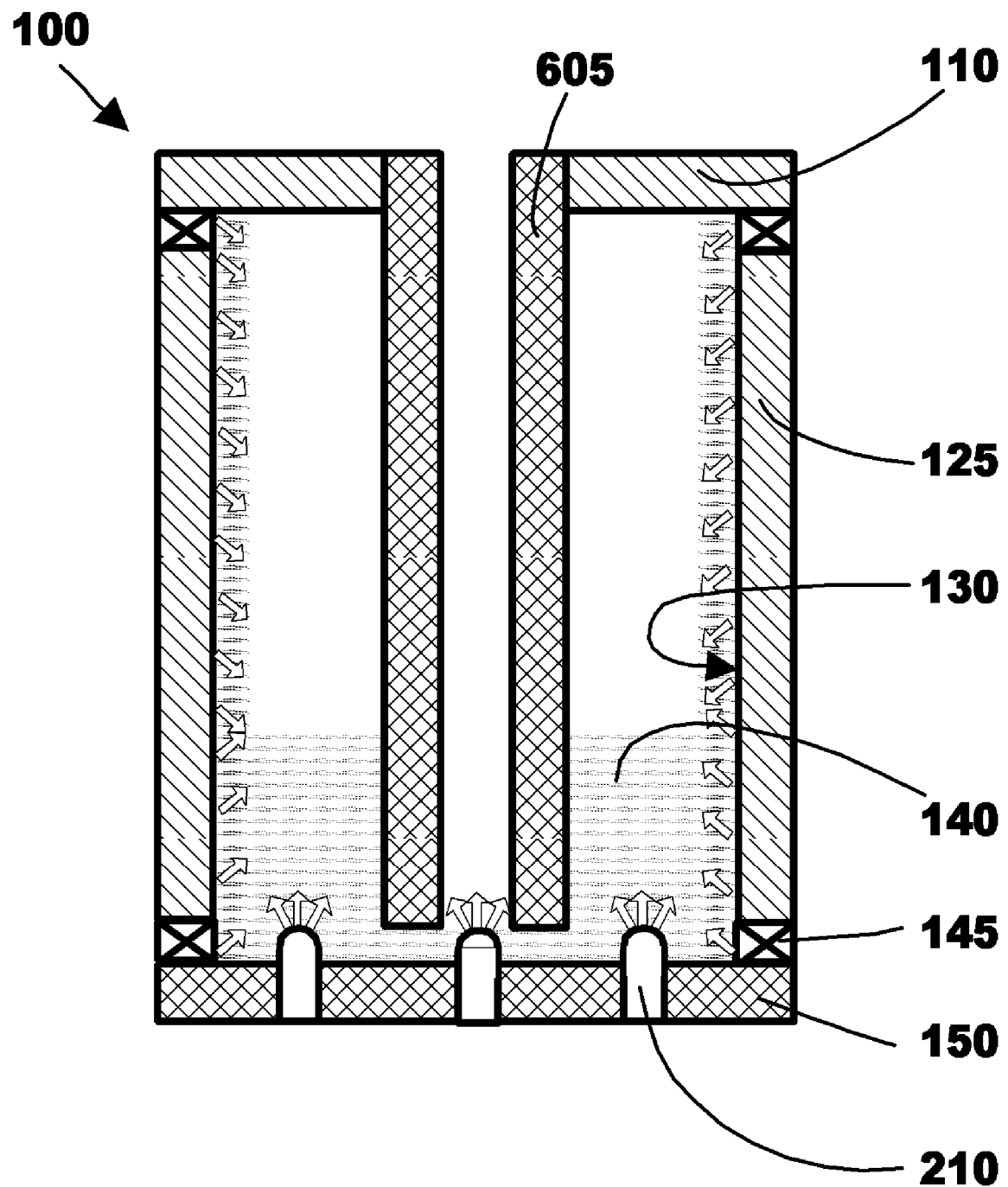
FIG. 8 is a cross-section of a reaction chamber with a co-axial cylindrical, radio-transparent central body extending partly into the reaction chamber.

FIG. 8 illustrates an alternative embodiment of the reaction chamber for use with an electromagnetic wave generator. In this embodiment, the reaction chamber (100) has a co-axial cylindrical central body (605) that is radio-transparent. Being radio-transparent also means that it is an electrical insulator. The co-axial cylindrical central body (605) extends from the gas outlet end (110) to a position above the fuel inlet end (150) such that a fluid within the reaction chamber can enter the cylindrical central body (605).

Primary combustion occurs in the annulus between the co-axial cylindrical central body (605) and the inner wall surface of the reaction chamber (130). Secondary combustion also occurs in the co-axial cylindrical central body (605). Standard spray nozzles (210) on the fuel inlet end (150) are employed with an additional spray nozzle directly underneath the co-axial cylindrical central body (605).

Figure 9:
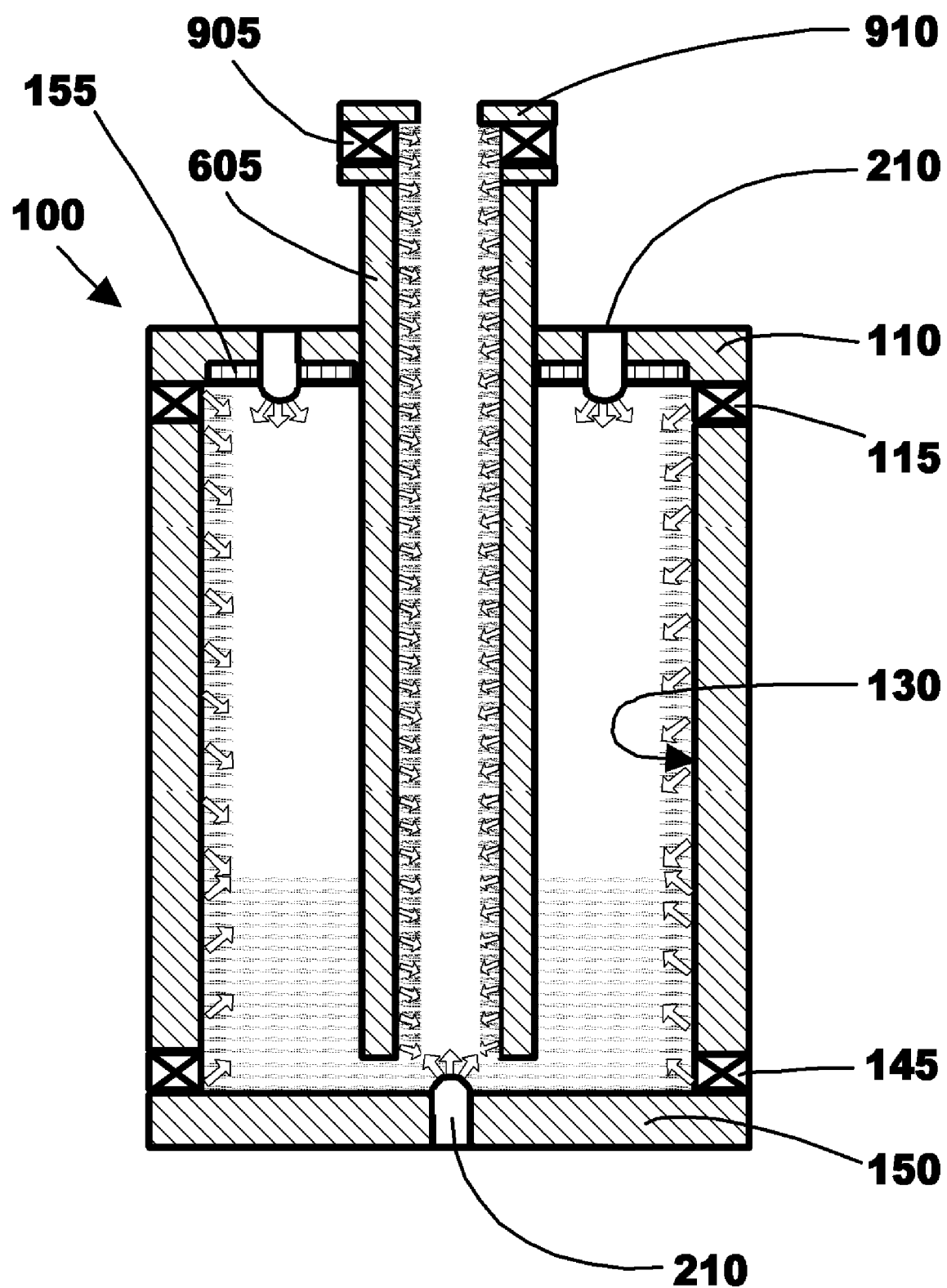
FIG. 9 is a cross-section of a reaction chamber with a co-axial cylindrical central body that has its own circumferential flow apparatus.

FIG. 9 illustrates an alternative embodiment of the reactor with a co-axial cylindrical central body (605) that has its own circumferential flow apparatus (905), adding a fourth circumferential fluid flow vortex to the reactor, which helically spirals into the reaction chamber (100). The co-axial cylindrical central body (605) extends from the gas outlet end (110) to a position above the fuel inlet end (150) such that fluid within the reaction chamber can enter the cylindrical central body (605). A cap (910) atop the circumferential flow apparatus (905) extends radially inward on the co-axial cylindrical central body (605) to limit the thickness of the downward spiraling fourth circumferential fluid flow vortex to the distance the cap extends radially inward. For this embodiment, standard spray nozzles (210) for introduction of fuel are at both ends of the reaction chamber (110, 150).

FIG. 9 shows an embodiment that is essentially a two-zone reactor. A first zone operates predominantly in the annulus between the co-axial cylindrical central body (605) and the inner wall surface of the reaction chamber (130). The first zone has the two circumferential fluid flow apparatus (115, 145) and standard spray nozzles (210) on the gas outlet end (110). A cathode (155) is located at on the gas outlet end. This first zone adds capability to operate with a fuel and oxidizer mixture different from a second zone. For example the first zone might have a very rich fuel and oxidizer mixture if the reactor is employed as a combustor, or it might have a first reagents blend if the reactor is employed as a chemical reactor.

The second zone operates predominantly within the co-axial cylindrical central body (605). The second zone has its own circumferential fluid flow apparatus (905), and standard spray nozzle (210) on the fuel inlet end (150). When operating as a combustor, the reaction products from the first zone enter the second zone with a lean mixture to complete combustion process. At the same time, fourth circumferential fluid flow vortex cools the inner wall of the co-axial cylindrical central body (605). Second zone combustion reduces pollution by assuring more complete combustion of the fuel and achieves a higher operating efficiency. When operating as a chemical reactor, the second zone offers a capability to utilize different reagents than employed in the first zone, for example, reagents selected to interact with the first zone reaction products.

The above-described embodiments are examples of the invention and merely provide illustrations of the invention. Other embodiments will be obvious to those skilled in the art. Thus, the scope of the invention is determined by the appended claims and their legal equivalents rather than by the examples given.

What is claimed is:

1. A triple helical flow vortex reactor with a reaction chamber having a fuel inlet end, a gas outlet end at opposing axial ends of the reaction chamber, and an inner wall, comprising,
   (a) a means for creating a fluid flow first vortex of combusted gases such that said combusted gases spiral away from said fuel inlet end towards said gas outlet end;
   (b) a first circumferential flow apparatus fluidly connected to the reaction chamber at the gas outlet end for creating a circumferential fluid flow second vortex at the periphery of the reaction chamber such that said second vortex spirals away from said apparatus towards the fuel inlet end in a direction reverse to the fluid flow first vortex; and,
   (c) a second circumferential flow apparatus at the fuel inlet end having a fluid connection for creating a circumferential fluid flow third vortex at the periphery of the reaction chamber such that said vortex spirals in a forward direction with the outward flow of combusted gases and creates a mixing region adjacent to the fuel inlet end.

2. The triple helical flow vortex reactor of claim 1, wherein the third circumferential flow apparatus is configured to produce a flow rate of the fluid in the third vortex less than the flow rate of the fluid in the second vortex.

3. The triple helical flow vortex reactor of claim 1 wherein the third circumferential flow apparatus is configured to produce a flow rate of the fluid in the third vortex up to 15 percent of the flow rate of the fluid in the second vortex.

4. The triple helical flow vortex reactor of claim 1 wherein the reaction chamber is configured to electrically connect to ground to form an anode; and further comprising, a charged cathode that is configured to
   (a) electrically insulate from and affix in the reaction chamber to the fuel inlet end;
   (b) enable formation of an arc initiated between the cathode and the anode in a circumferential gap that spans the fluid connection from the second circumferential flow apparatus; and,
   (c) enable the arc to expand away from the circumferential gap.

5. The triple helical flow vortex reactor of claim 4, wherein the cathode is a shaped body that rises into a mixing zone.

6. The triple helical flow vortex reactor of claim 4, wherein the circumferential gap is less than about 3 millimeters.

7. The triple helical flow vortex reactor of claim 4, wherein the second circumferential flow apparatus is electrically non-conducting and has a layer of material on its surface facing the reaction chamber to partially increase electrical conductivity of said surface, said layer of material selected from the group consisting of a semi-conductor and sapphire.

8. The triple helical flow vortex reactor of claim 4, wherein the second circumferential flow apparatus is electrically non-conducting and has an electrical conductor which is electrically connected to the anode and inserted into the second circumferential flow apparatus, said conductor being inserted at a location that separates it from the cathode by the circumferential gap.

9. The triple helical flow vortex reactor of claim 4, wherein the second circumferential flow apparatus comprises,
  (a) a first portion configured to electrically conduct and to electrically connect to the anode; and,
  (b) a second portion comprising an electrically non-conducting material configured to be recessed in respect to the first portion, serves to insulate the anode from the fuel inlet end; and is of a thickness to provide the necessary circumferential gap between the anode and cathode.

10. The triple helical flow vortex reactor of claim 9 further comprising a layer of material on a surface of the second portion facing the reaction chamber to partially increase electrical conductivity of said surface of the second portion, said layer of material selected from the group consisting of a semi-conductor and sapphire.

11. The triple helical flow vortex reactor of claim 4, further comprising a co-axial cylindrical central body within the reaction chamber.

12. The triple helical flow vortex reactor of claim 11, wherein the co-axial cylindrical central body extends through the reaction chamber and is configured to restrict the first, second and third vortexes to an annulus extending from the outer wall of the co-axial cylindrical central body to the inner wall of the reaction chamber.

13. The triple helical flow vortex reactor of claim 12, wherein the co-axial cylindrical central body is double-walled and perforated such that oxidizer and reagents can be fed into the reaction chamber through the perforations.

14. The triple helical flow vortex reactor of claim 11, wherein the co-axial cylindrical central body extends from the gas outlet end to a position above the fuel inlet end such that fluid within the reaction chamber can enter the cylindrical central body and wherein said coaxial cylindrical central body comprises,
  (a) a circumferential flow apparatus attached to the coaxial cylindrical central body;
  (b) a cap atop said circumferential flow apparatus that extends radially inward on the coaxial cylindrical central body; and,
  (c) spray nozzles for introduction of fuel at both ends of the reaction chamber.

15. The triple helical flow vortex reactor of claim 1, further comprising at least one additional coaxially adjoining triple helical flow vortex reactor, wherein the reaction chambers are fluidly connected together in series, such that the gas outlet end of any one reactor adjoins the fuel inlet end of another reactor.

16. The triple helical flow vortex reactor of claim 1, further comprising a circumferential flow restrictor on the inner wall of the reaction chamber to limit the circumferential fluid flows from the second and third vortexes.

17. The triple helical flow vortex reactor of claim 1, wherein at least a portion of said reaction chamber is configured to be radio-transparent and further comprising an electromagnetic wave generator, which comprises,
  (a) a high frequency generator capable of creating electromagnetic waves at a plurality of frequencies selected from within a range of tens of kilohertz to hundreds of gigahertz through said portion;
  (b) a wave guide;
  (c) an initiator within the reaction chamber; and,
  (d) a plasma generator capable of initiating plasma discharges by injecting ionized fuel and oxidizer into the reaction chamber.

18. The triple helical flow vortex reactor of claim 17, further comprising a co-axial cylindrical, radio-transparent central body within the reaction chamber extending from the gas outlet end to a position above the fuel inlet end such that a fluid within the reaction chamber can enter the central body and exit the reaction chamber at the gas outlet end.

* * * * *